US012521769B2

(12) United States Patent
Kim et al.

(10) Patent No.: US 12,521,769 B2
(45) Date of Patent: Jan. 13, 2026

(54) WAFER POLISHING APPARATUS AND METHOD OF DETECTING DEFECT OF RETAINER RING INCLUDED IN THE WAFER POLISHING APPARATUS

(71) Applicant: Samsung Electronics Co., Ltd., Suwon-si (KR)

(72) Inventors: Jongsu Kim, Seongnam-si (KR); Johnho Kuk, Osan-si (KR); Sunil Park, Cedar Park, TX (US); Kwangsung Lee, Yongin-si (KR); Yoichiro Iwa, Suwon-si (KR); Sewon Jeon, Hwaseong-si (KR); Youngho Jung, Hwaseong-si (KR)

(73) Assignees: Samsung Electronics Co., Ltd., Suwon-si (KR); TSC Inc., Hwaseong-si (KR)

( * ) Notice: Subject to any disclaimer, the term of this patent is extended or adjusted under 35 U.S.C. 154(b) by 690 days.

(21) Appl. No.: 17/870,340

(22) Filed: Jul. 21, 2022

(65) Prior Publication Data

US 2023/0166299 A1 Jun. 1, 2023

(30) Foreign Application Priority Data

Nov. 29, 2021 (KR) ........................ 10-2021-0167730

(51) Int. Cl.
*B08B 3/02* (2006.01)
*B24B 37/005* (2012.01)

(52) U.S. Cl.
CPC ............ *B08B 3/02* (2013.01); *B24B 37/0053* (2013.01)

(58) Field of Classification Search
CPC ... G02B 27/006; B24B 37/005; B24B 37/042; B24B 49/12; B24B 53/017
See application file for complete search history.

(56) References Cited

U.S. PATENT DOCUMENTS

| | | | |
|---|---|---|---|
| 9,434,044 B2 | 9/2016 | Kosuge et al. | |
| 2008/0031510 A1 | 2/2008 | Jung | |
| 2009/0023362 A1* | 1/2009 | Chen | B24B 37/32 451/36 |

(Continued)

FOREIGN PATENT DOCUMENTS

| | | | |
|---|---|---|---|
| JP | 2006/035353 A | | 2/2006 |
| KR | 20130102699 A | * | 9/2013 |

(Continued)

*Primary Examiner* — Joel D Crandall
(74) *Attorney, Agent, or Firm* — Wolf, Greenfield & Sacks, P.C.

(57) ABSTRACT

A wafer polishing apparatus includes a base support; a polishing pad on the base support; a polishing head on an upper portion of the base support and configured to rotate; a polishing head support on the upper portion of the base support and connected to the polishing head, a retainer ring attached to a lower portion of the polishing head; an illumination device configured to provide light to at least a part of an inner surface of the retainer ring; and a camera device configured to capture an image of at least a part of the inner surface of the retainer ring while the polishing head rotates. The polishing head support may be configured to rotate on the base support such that the polishing head is on at least one of a treatment region or a maintenance region of the base support.

19 Claims, 16 Drawing Sheets

(56) References Cited

U.S. PATENT DOCUMENTS

| | | | | |
|---|---|---|---|---|
| 2015/0273649 | A1* | 10/2015 | Kosuge | B24B 37/0053 451/5 |
| 2015/0381857 | A1* | 12/2015 | Daly | H04N 23/50 33/266 |
| 2017/0192226 | A1* | 7/2017 | Eineren | G03B 17/02 |
| 2019/0283209 | A1* | 9/2019 | Osterheld | B24B 37/005 |
| 2020/0094370 | A1 | 3/2020 | Cherian et al. | |
| 2020/0151868 | A1 | 5/2020 | Benvegnu et al. | |

FOREIGN PATENT DOCUMENTS

| | | | |
|---|---|---|---|
| KR | 101322410 | B1 | 10/2013 |
| KR | 101933826 | B1 | 12/2018 |
| KR | 10-2020-0121500 | A | 10/2020 |

* cited by examiner

WAFER POLISHING APPARATUS AND METHOD OF DETECTING DEFECT OF RETAINER RING INCLUDED IN THE WAFER POLISHING APPARATUS

CROSS-REFERENCE TO RELATED APPLICATION

This application is based on and claims priority under 35 U.S.C. § 119 to Korean Patent Application No. 10-2021-0167730, filed on Nov. 29, 2021 in the Korean Intellectual Property Office, the disclosure of which is incorporated by reference herein in its entirety.

BACKGROUND

Inventive concepts relate to a wafer polishing apparatus and, more particularly to, a wafer polishing apparatus that detects a defect of a retainer ring.

For performing a wafer polishing process, a wafer polishing apparatus may include a polishing pad on which a wafer is seated, and a polishing head disposed on an upper portion of the polishing pad and configured to rotate the wafer. In addition, in order to limit and/or prevent the wafer from slipping in the wafer polishing process, the wafer polishing apparatus may include a retainer ring attached to the polishing head to support a part of the wafer. When the retainer ring has a defect on its surface, a part of the wafer may be damaged by the defect. Accordingly, it is important to quickly and precisely detect a defect of the retainer ring before performing the wafer polishing process.

SUMMARY

Inventive concepts provide a wafer polishing apparatus capable of quickly and precisely detecting a defect of a retainer ring.

Inventive concepts provide a method of detecting a defect of a retaining ring quickly and precisely.

According to an embodiment of inventive concepts, a wafer polishing apparatus may include a base support; a polishing head on an upper portion of the base support and configured to rotate; a retainer ring attached to a lower portion of the polishing head; an illumination device configured to provide light to at least a part of an inner surface of the retainer ring; and a camera device configured to capture an image of at least a part of an inner surface of the retainer ring. The camera device may include a camera housing; a camera lens inside the camera housing; a cover ring on a front surface of the camera lens and configured to expose the camera lens and coupled to the camera housing; a camera cleaning liquid supply pipe connected to the cover ring and configured to supply a cleaning liquid to the front surface of the camera lens; a camera cleaning gas supply pipe connected to the cover ring and configured to provide cleaning gas to the front surface of the camera lens; and a protective cap coupled to the cover ring. The protective cap may be configured to expose at least a part of the front surface of the camera lens and configured to provide a discharge passage of the cleaning gas.

According to an embodiment of inventive concepts, a wafer polishing apparatus may include a base support including a treatment region and a maintenance region; a polishing pad on the treatment region of the base support; a polishing head on an upper portion of the base support and configured to rotate; a polishing head support provided on the upper portion of the base support and connected to the polishing head, and configured to rotate on the base support such that the polishing head is on at least one of the treatment region or the maintenance region of the base support; a retainer ring attached to a lower portion of the polishing head; an illumination device configured to provide light to at least a part of an inner surface of the retainer ring; and a camera device configured to capture an image of at least a part of the inner surface of the retainer ring while the polishing head rotates.

According to an embodiment of inventive concepts, a method of detecting a defect of a retainer ring included in a wafer polishing apparatus is provided. The method may include rotating a polishing head that is coupled to the retainer ring; obtaining a reference captured photo and a comparison captured photo by capturing an image of an inner surface of the retainer ring; aligning the reference captured photo and the comparison captured photo; detecting the defect of the retainer ring through the reference captured photo and the comparison captured photo; and determining whether to use the retainer ring based on the detected defect of the retainer ring. The determining whether to use the retainer ring may include controlling the wafer polishing apparatus to not use the retainer ring if the detecting the defect of the retainer ring indicates an actual defect exists on the retainer ring or controlling the wafer polishing apparatus to use the retainer ring if the detecting the defect of the retainer ring does not indicate the actual defect exists on the retainer ring.

The wafer polishing apparatus according to an embodiment of inventive concepts may include a camera device configured to capture the image of the inner surface of the retainer ring while the retainer ring rotates at high speed, thereby quickly detecting a defect of the inner surface of the retainer ring.

In addition, the wafer polishing apparatus according to an embodiment of inventive concepts may supply a cleaning liquid and a cleaning gas to the camera lens of the camera device, and supply the cleaning liquid to the illumination lens of the illumination device, thereby improving a phenomenon in which foreign substances generated in the wafer polishing process are adsorbed to the camera lens and the illumination device. Accordingly, the camera device and the illumination device may precisely detect the defect of the retainer ring.

In addition, the wafer polishing apparatus according to an embodiment of inventive concepts may detect the defect of the retainer ring through comparison of a reference captured photo of the retainer ring obtained through the camera device and the comparison captured photo, and determine whether to use the retainer ring based on the detected defect. Accordingly, in the wafer polishing process, damage to the wafer due to the defect of the retainer ring may be limited and/or prevented.

BRIEF DESCRIPTION OF THE DRAWINGS

Embodiments of inventive concepts will be more clearly understood from the following detailed description taken in conjunction with the accompanying drawings in which.

DETAILED DESCRIPTION

Hereinafter, embodiments of inventive concepts will be described in detail with reference to the accompanying drawings.

Figure 1:
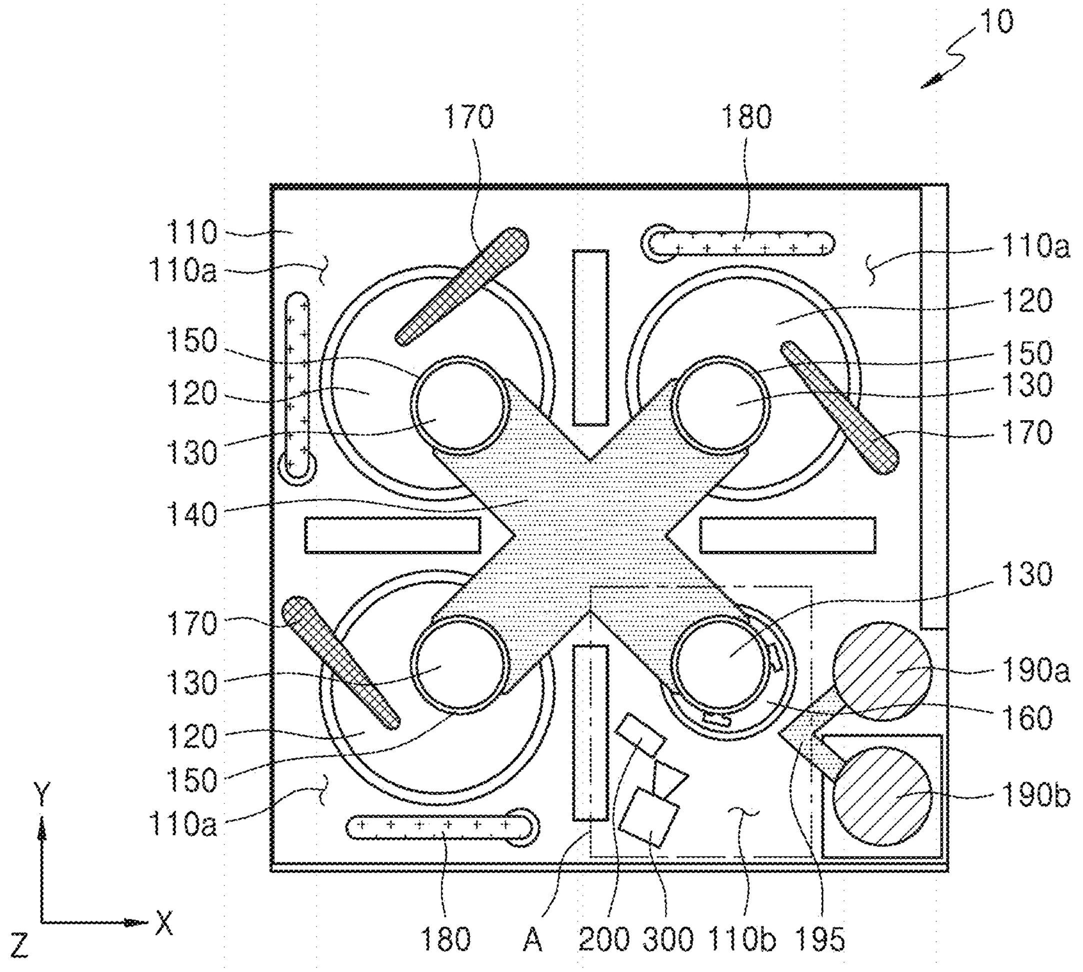
FIG. 1 is a plan view of a wafer polishing apparatus according to an embodiment of inventive concepts.

FIG. 1 is a plan view of a wafer polishing apparatus 10 according to an embodiment of inventive concepts. Also, FIG. 2 is a three-dimensional (3D) view illustrating a region "A" in FIG. 1.

Figure 2:
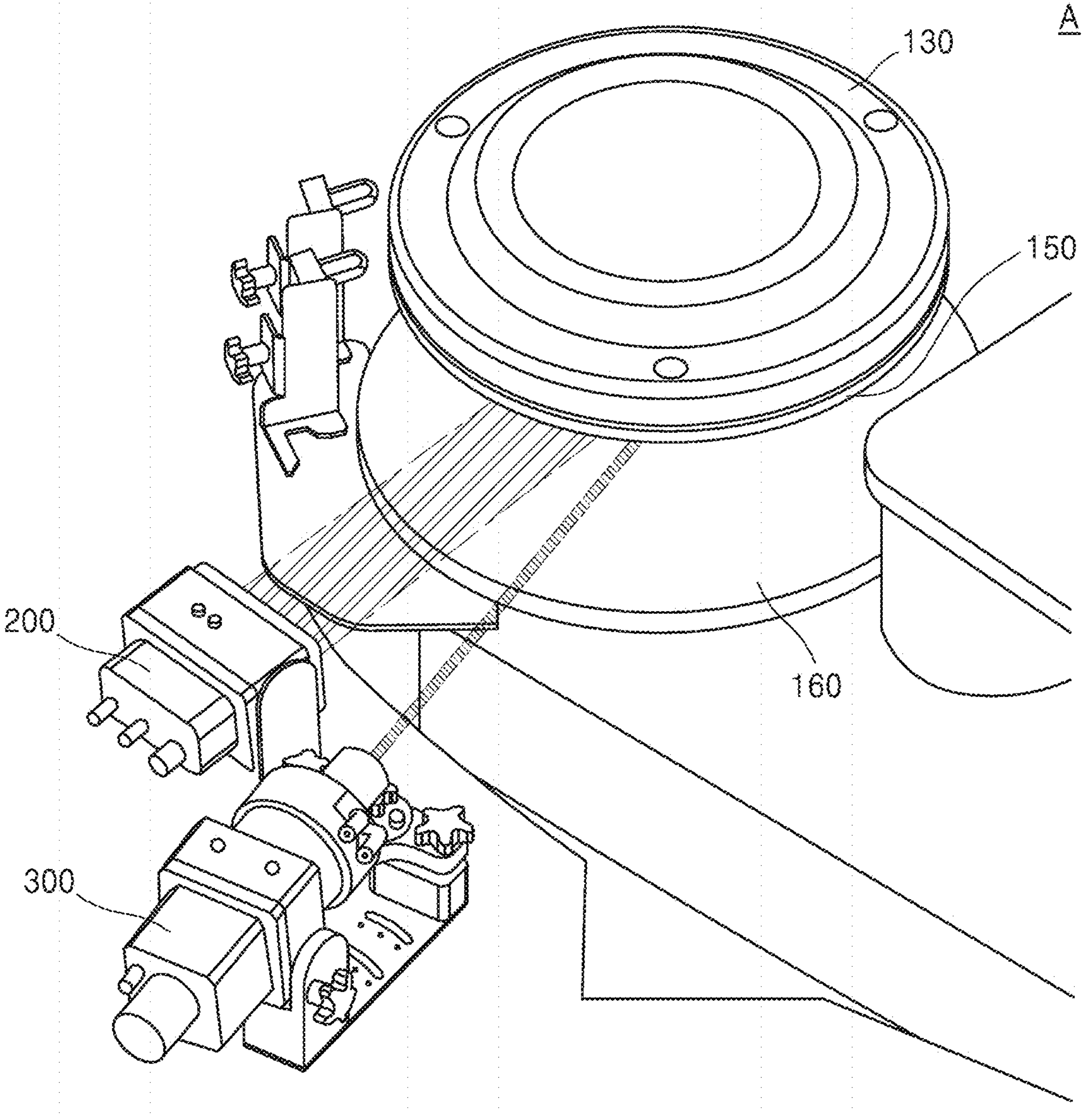
FIG. 2 is a three-dimensional (3D) view illustrating a region “A” in FIG. 1.

Referring to FIGS. 1 and 2 together, the wafer polishing apparatus 10 may include a base support 110, a polishing pad 120, a polishing head 130, a polishing head support 140, a retainer ring 150, a transfer plate 160, a slurry supply device 170 (e.g., a pump coupled to conduit and nozzle for providing slurry through conduit and nozzle), a conditioner 180, a wafer loading plate 190*a*, a wafer unloading plate 190*b*, a wafer exchange arm 195, an illumination device 200, a camera device 300, etc.

The base support 110 may support the polishing pad 120, the polishing head support 140, the transfer plate 160, the slurry supply device 170, the conditioner 180, the wafer loading plate 190*a*, the wafer unloading plate 190*b*, etc. The base support 110 may be a flat structure and may have a rectangular shape, but is not limited thereto.

In addition, an upper surface of the base support 110 may include a treatment region 110_*a* in which a wafer polishing process is performed, and a maintenance region 110_*b* in which the polishing head 130, the retainer ring 150, and a wafer cleaning process, and a defect detection process of the retainer ring 150, etc. are performed. For example, the upper surface of the base support 110 may include three treatment regions 110_*a* and one maintenance region 110_*b*. However, the number of treatment regions 110_*a* and maintenance regions 110_*b* included in the base support 110 is not limited to the above description.

The polishing pad 120 may be disposed on the treatment region 110_*a* of the base support 110. In addition, the polishing pad 120 may be configured to rotate with respect to a rotation axis extending in a vertical direction. Hereinafter, the vertical direction may be defined as a direction (e.g., a Z direction) perpendicular to a direction in which the upper surface of the base support 110 extends, and a horizontal direction may be defined as a direction (e.g., a direction in which an X-Y plane extends) parallel to the direction in which the upper surface of the base support 110 extends. As the polishing pad 120 rotates on the base support 110, a wafer may be polished by friction between the polishing pad 120 and the wafer.

The polishing head 130 may be disposed on an upper portion of the base support 110 and configured to rotate with respect to the rotation axis extending in the vertical direction. Accordingly, the retainer ring 150 and the wafer coupled to the polishing head 130 may rotate on the upper portion of the base support 110. A motor may be used to rotate the polishing head 130.

In an embodiment, the polishing head 130 may be coupled to the polishing head support 140 so as to be disposed at a lower vertical level than that of the polishing head support 140. The wafer coupled to the polishing head 130 may rotate on the polishing pad 120 through rotation of the polishing head 130.

The polishing head support 140 may be provided in a cross shape on the upper portion of the base support 110. In addition, the polishing head support 140 may be disposed at a higher vertical level than that of the polishing head 130, and may rotate with respect to the rotation axis extending in the vertical direction on the base support 110.

The polishing head 130 coupled to the polishing head support 140 may be disposed in any one of the treatment region 110_*a* and the maintenance region 110_*b* of the base support 110 through rotation of the polishing head support 140.

The retainer ring 150 may be coupled to a lower portion of the polishing head 130. In addition, the retainer ring 150 may support at least a part of the wafer in the wafer polishing process. For example, the wafer may be supported by an inner surface of the retainer ring 150.

However, when the retainer ring 150 has a defect such as a scratch or a crack on the inner surface, there is a risk that a part of the wafer may be damaged by the defect. Accordingly, it may be important to quickly and precisely detect the defect of the retainer ring 150 before performing the wafer polishing process.

Figure 10:
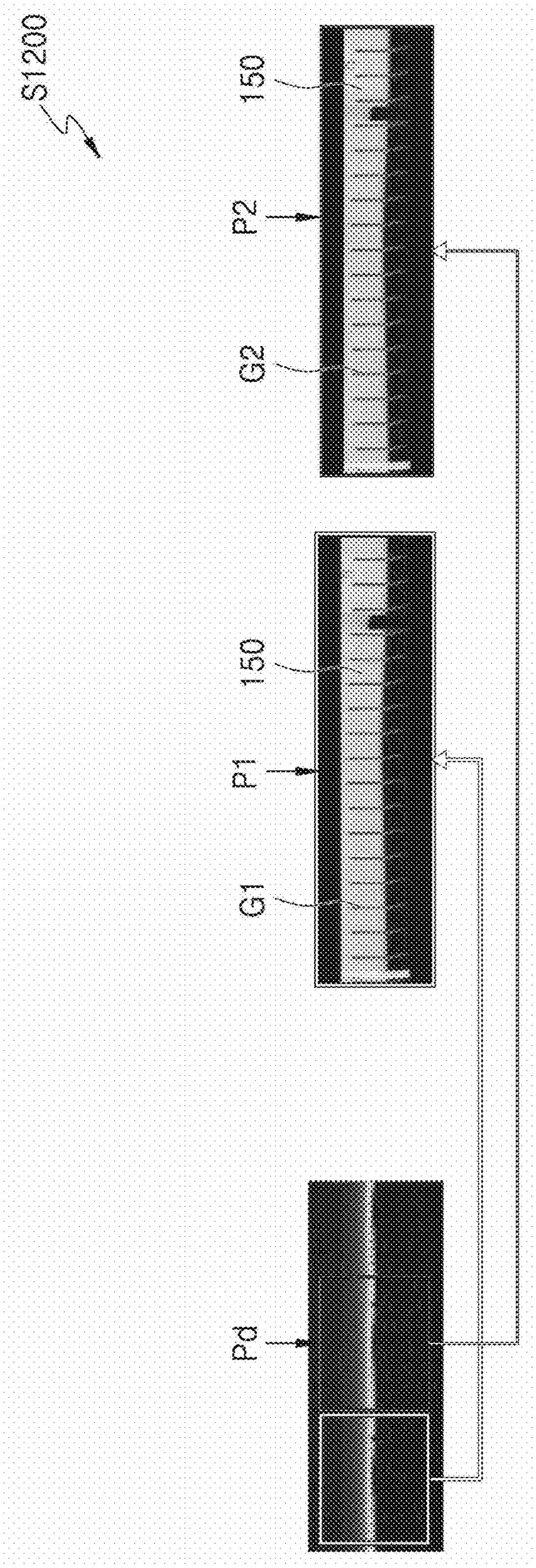
FIG. 10 is a view showing an operation of obtaining a reference captured photo and a comparison captured photo by capturing an image of an inner surface of the retainer ring according to an embodiment of inventive concepts.

Also, the retainer ring 150 may include a plurality of grooves (G1 and G2 in FIG. 10). The plurality of grooves G1 and G2 of the retainer ring 150 may provide a movement path of the slurry provided to the slurry supply device 170. Accordingly, the slurry may be provided in a space between the wafer and the polishing pad 120, and the slurry may chemically and mechanically polish the wafer through rotation of the polishing pad 120 and the polishing head 130.

The transfer plate 160 may be disposed on the maintenance region 110_*b* of the base support 110. Also, the transfer plate 160 may move in the vertical direction. For example, the transfer plate 160 may move in a direction away from the upper surface of the base support 110.

In an embodiment, the transfer plate 160 may be a plate on which the wafer is temporarily seated. Also, the transfer plate 160 may be a plate on which an alignment jig (710 in FIG. 7) which will be described below is seated.

The slurry supply device 170 may be configured to supply the slurry to the upper portion of the polishing pad 120. The slurry may include abrasive particles and chemical additive. The polishing particles may perform mechanical polishing of the wafer, and the chemical additive may perform chemical polishing of the wafer.

The conditioner 180 may be configured to apply pressure to the surface of the polishing pad 120 so that the surface of the polishing pad 120 has a uniform flatness. The conditioner 180 may include a substrate.

The wafer disposed on the wafer loading plate 190*a* may be loaded into the transfer plate 160. In addition, the wafer disposed on the transfer plate 160 may be unloaded to the wafer unloading plate 190*b*. The wafer exchange arm 195 may include a robot arm for loading and unloading the aforementioned wafer.

The illumination device 200 may be disposed on the maintenance region 110_*b* of the base support 110 and may be configured to provide light to at least a part of an inner surface of the retainer ring 150. Features related to the illumination device 200 will be described in more detail with reference to FIG. 3.

The camera device 300 may be disposed on the maintenance region 110_*b* of the base support 110, and may be configured to capture an image of at least a part of the inner surface of the retainer ring 150. In an embodiment, the camera device 300 may be configured to capture the image of at least a part of the inner surface of the retainer ring 150 while the retainer ring 150 attached to the polishing head 130 rotates.

In an embodiment, the camera device 300 may include a line scan camera. The camera device 300 including the line scan camera may capture the image of at least a part of the inner surface of the retainer ring 150 while the retainer ring 150 rotates, thereby quickly capturing an image of the inner surface of the retainer ring 150.

In addition, the camera device 300 may capture the image of at least a part of the inner surface of the retainer ring 150 while the retainer ring 150 rotates, and thus a difference in optical resolution may be reduced in a photo of the retainer ring 150 captured by the camera device 300. Accordingly, in embodiments of inventive concepts, the camera device 300 may precisely detect a defect formed on the inner surface of the retainer ring 150.

Features related to the camera device 300 will be described in more detail with reference to FIGS. 3 to 5.

In an embodiment, the illumination device 200 and the camera device 300 may be connected to each other. However, inventive concepts are not limited thereto, and the illumination device 200 and the camera device 300 alternatively may not be connected to each other and may be spaced apart from each other.

Figure 3:
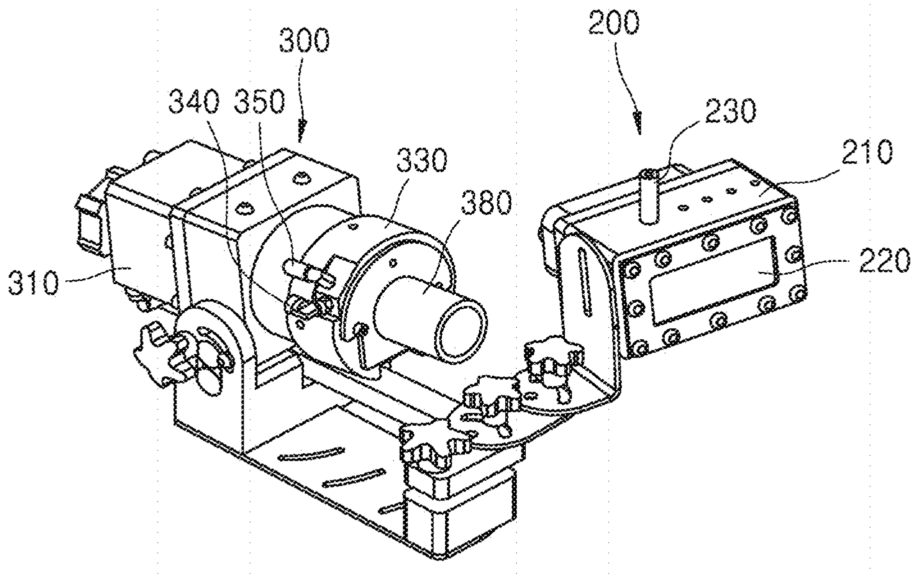
FIG. 3 is a 3D view illustrating an illumination device and a camera device according to an embodiment of inventive concepts.

FIG. 3 is a 3D view illustrating the illumination device 200 and the camera device 300 according to an embodiment of inventive concepts. FIG. 4 is a 3D view illustrating the camera device 300 from which a protective cap 380 is removed according to an embodiment of inventive concepts. FIG. 5 is a 3D view illustrating the camera device 300 to which the protective cap 380 is coupled according to an embodiment of inventive concepts.

Figure 4:
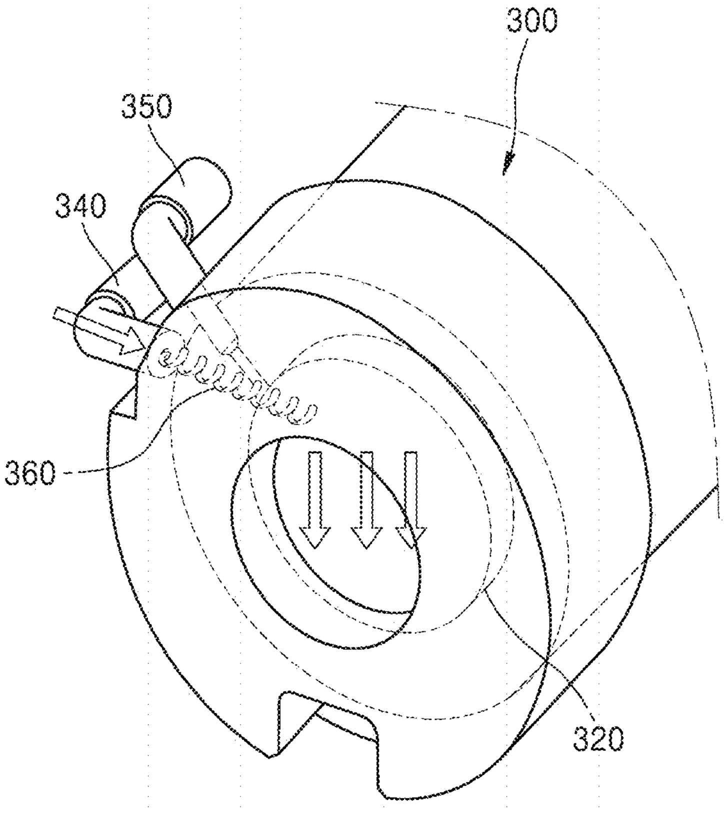
FIG. 4 is a 3D view illustrating the camera device from which a protective cap is removed according to an embodiment of inventive concepts.
Figure 5:
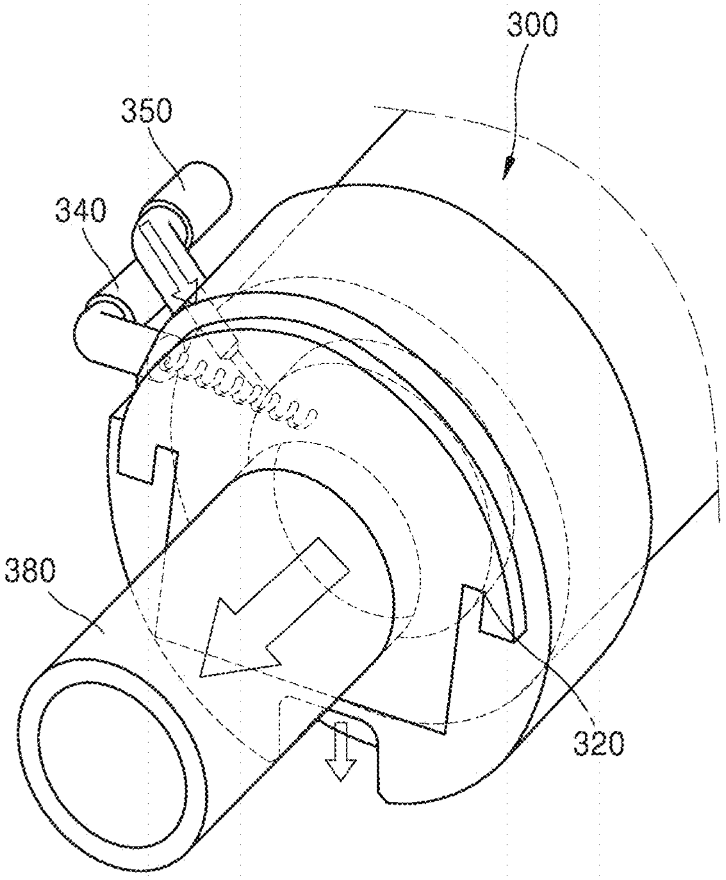
FIG. 5 is a 3D view illustrating the camera device to which the protective cap is coupled according to an embodiment of inventive concepts.

Referring to FIGS. 3 to 5, the illumination device 200 may include an illumination housing 210, an illumination light source (not shown), an illumination lens 220, an illumination cleaning liquid supply pipe 230, etc. In addition, the camera device 300 may include a camera housing 310, a camera lens 320, a cover ring 330, a camera cleaning liquid supply pipe 340, a camera cleaning gas supply pipe 350, the protective cap 380, etc.

The illumination housing 210 may provide a space in which the illumination light source and the illumination lens 220 are disposed. The illumination light source (e.g., lamp, light-emitting diode, laser) may be disposed inside the illumination housing 210 and configured to emit light.

The illumination lens 220 may be disposed in front of the illumination light source and configured to refract light emitted from the illumination light source. In an embodiment, the illumination lens 220 may be configured to refract the light emitted from the illumination light source so that the light is focused on a part of an inner surface of the retainer ring 150. For example, the illumination lens 220 may include a cylindrical lens to provide light in a line shape to a part of the inner surface of the retainer ring 150.

The illumination cleaning liquid supply pipe 230 may be connected to the illumination housing 210 and configured to supply a cleaning liquid to a front surface of the illumination lens 220. In addition, the illumination cleaning liquid supply pipe 230 may be connected to a cleaning liquid supply pump 630 which will be described below.

The illumination cleaning liquid supply pipe 230 may supply the cleaning liquid received from the cleaning liquid supply pump 630 to the illumination lens 220 while the illumination lens 220 is operating. Accordingly, a phenomenon in which foreign substances generated in a wafer polishing process are adsorbed to a surface of the illumination lens 220 may be limited and/or prevented, and the performance of the illumination device 200 may be improved.

In an embodiment, the cleaning liquid may include deionized water (DIW). However, the type of the cleaning liquid is not limited to the above description.

The camera device 300 may include a line scan camera. That is, the camera device 300 may include a camera sensor in a linear shape. Also, the camera device 300 may capture the image of the inner surface of the retainer ring 150 while the retainer ring 150 rotates. Accordingly, the camera device 300 may precisely detect a defect on the inner surface of the retainer ring 150 even while the retainer ring 150 rotates at a high speed.

The camera housing 310 may provide a space in which the camera lens 320 is disposed. Also, the camera lens 320 may be disposed inside the camera housing 310.

The cover ring 330 may be coupled to the camera housing 310 to be disposed on the front surface of the camera lens 320. In addition, the cover ring 330 may be provided in a ring shape exposing the camera lens 320.

The camera cleaning liquid supply pipe 340 may be connected to the cover ring 330 and configured to supply the cleaning liquid to the front surface of the camera lens 320. In an embodiment, one side of the camera cleaning liquid supply pipe 340 may be connected to the cover ring 330, and the other side thereof may be connected to the cleaning liquid supply pump 630.

In an embodiment, the cleaning liquid may include DIW. However, the type of the cleaning liquid is not limited to the above description.

In an embodiment, the camera cleaning liquid supply pipe 340 may supply the cleaning liquid to the front surface of the camera lens 320 in a standby state in which the camera device 300 does not operate. Also, the camera cleaning liquid supply pipe 340 may stop supplying the cleaning liquid to the front surface of the camera lens 320 in an operating state where the camera device 300 operates.

The camera cleaning gas supply pipe 350 may be connected to the cover ring 330 and configured to supply a cleaning gas to the front surface of the camera lens 320. In an embodiment, one side of the camera cleaning gas supply pipe 350 may be connected to the cover ring 330, and the other side thereof may be connected to the cleaning gas supply pump 640.

In an embodiment, the cleaning gas may include nitrogen ($N_2$). However, the type of cleaning gas is not limited to the above description.

In an embodiment, the camera cleaning gas supply pipe 350 may not supply the cleaning gas to the front surface of the camera lens 320 in a standby state in which the camera device 300 does not operate.

In addition, the camera cleaning gas supply pipe 350 may supply the cleaning gas to the front surface of the camera lens 320 in an operating state where the camera device 300 operates. That is, the cleaning gas may be supplied to the front surface of the camera lens 320 while the camera device 300 is operating, and thus the cleaning liquid provided to the camera lens 320 may be removed.

In addition, the cleaning gas may be supplied to the front surface of the camera lens 320 while the camera device 300 is operating, thereby limiting and/or preventing a phenomenon in which foreign substances generated in the wafer polishing process are adsorbed to the surface of the camera lens 320 and, improving the performance of the camera device 300.

The protective cap 380 may be coupled to a front surface of the cover ring 330. In addition, the protective cap 380 may expose the camera lens 320 and provide a discharge passage of the cleaning gas. That is, the cleaning gas provided from the camera cleaning gas supply pipe 350 may be discharged to the outside of the camera device 300 through the discharge passage of the protective cap 380.

In addition, a part of the cleaning gas provided from the camera cleaning gas supply pipe 350 may be discharged to the outside of the camera device 300 through an opening provided in a lower portion of the cover ring 330.

The camera device 300 of inventive concepts may further include a camera cleaning liquid spray pipe 360 that is connected to the camera cleaning liquid supply pipe 340, disposed inside the cover ring 330, and provided in a spiral shape.

In an embodiment, the camera cleaning liquid spray pipe 360 may be connected to the camera cleaning liquid supply pipe 340, and may spray the cleaning liquid to the front surface of the camera lens 320.

In an embodiment, because the camera cleaning liquid spray pipe 360 may be provided in a spiral shape, the cleaning liquid provided from the camera cleaning liquid supply pipe 340 may form turbulence inside the camera cleaning liquid spray pipe 360. Accordingly, the cleaning efficiency of the camera lens 320 may be improved by the cleaning liquid sprayed from the camera cleaning liquid spray pipe 360.

The illumination device 200 according to an embodiment of inventive concepts may include the illumination cleaning liquid supply pipe 230, and the camera device 300 may include the camera cleaning liquid supply pipe 340 and the camera cleaning gas supply pipe 350, thereby limiting and/or preventing contamination of the illumination device 200 and the camera device 300 by foreign substances generated in the wafer polishing process, and precisely detecting a defect on the inner surface of the retainer ring 150 by using the illumination device 200 and the camera device 300.

Figure 6:
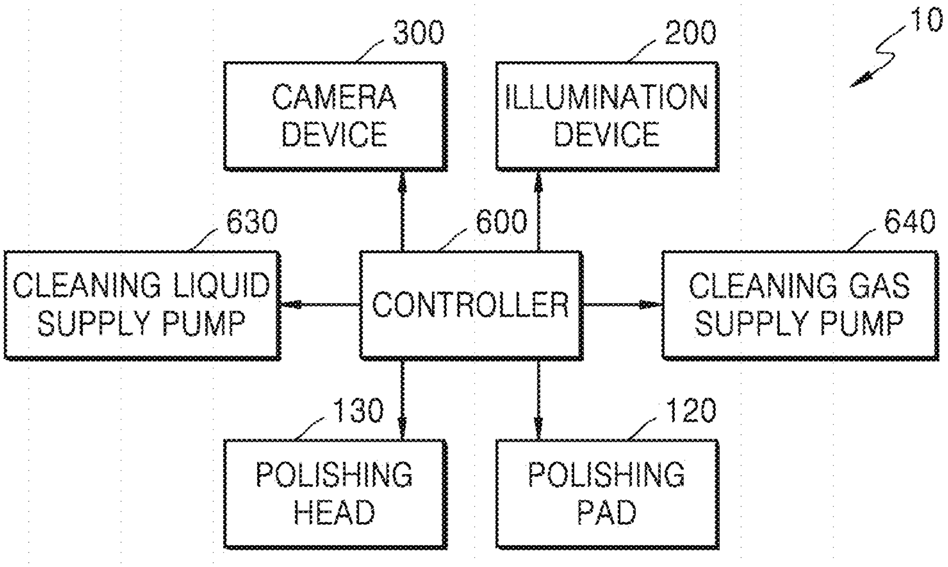
FIG. 6 is a signal flowchart of the wafer polishing apparatus according to an embodiment of inventive concepts.

FIG. 6 is a signal flowchart of the wafer polishing apparatus 10 according to an embodiment of inventive concepts.

Referring to FIG. 6, the wafer polishing apparatus 10 of inventive concepts may include a cleaning liquid supply pump 630, a cleaning gas supply pump 640, a controller 600, etc.

The cleaning liquid supply pump 630 may be connected to at least one of the illumination cleaning liquid supply pipe 230 or the camera cleaning liquid supply pipe 340, and may be configured to supply a cleaning liquid to any one of the illumination cleaning liquid supply pipe 230 and the camera cleaning liquid supply pipe 340. The cleaning liquid may include DIW.

In an embodiment, the cleaning liquid supply pump 630 may adjust at least one of a flow rate, a flow volume, or a hydraulic pressure of a cleaning liquid.

The cleaning gas supply pump 640 may be connected to the camera cleaning gas supply pipe 350 and may be configured to supply the cleaning gas to the camera cleaning gas supply pipe 350. The cleaning gas may include nitrogen.

In an embodiment, the cleaning gas supply pump 640 may adjust at least one of a flow rate, a flow volume, or a hydraulic pressure of a cleaning gas.

The controller 600 may be configured to generally control the operation of the wafer polishing apparatus 10. The controller 600 may be connected to the polishing pad 120, the polishing head 130, the illumination device 200, the camera device 300, the cleaning liquid supply pump 630, the cleaning gas supply pump 640, etc., and may control at least one of the polishing pad 120, the polishing head 130, the illumination device 200, the camera device 300, the cleaning liquid supply pump 630, or the cleaning gas supply pump 640.

In an embodiment, the controller 600 may be implemented in hardware, firmware, software, or any combination thereof. For example, the controller 600 may be a computing device such as a workstation computer, a desktop computer, a laptop computer, a tablet computer, etc. The controller 600 may be a simple controller, a complex processor such as a microprocessor, CPU, GPU, etc., a processor configured by software, dedicated hardware, or firmware. The controller 600 may be implemented by, for example, a general-purpose computer or application-specific hardware such as a digital signal process (DSP), a field programmable gate array (FPGA), and an application specific integrated circuit (ASIC).

In an embodiment, the operation of the controller 600 may be implemented as instructions stored on a machine-readable medium that may be read and executed by one or more processors. Here, the machine-readable medium may include any mechanism storing and/or transmitting information in a readable form by machine (e.g., a computing device). For example, machine-readable media may include read only memory (ROM), random access memory (RAM), magnetic disk storage media, optical storage media, flash memory devices, electrical, optical, acoustic, or other forms of propagation signals (for example, carrier waves, infrared signals, digital signals, etc.) and any other signal.

The controller 600 may be implemented by firmware, software, routines, and instructions for operating the wafer polishing apparatus 10. For example, the controller 600 may receive data for feedback, may generate a signal for operating the wafer polishing apparatus 10, and may be implemented by software that performs a desired and/or alternatively predetermined operation. The controller 600 may operate in response to instructions, signals, commands, and/or information input thereto, thereby transforming the controller 600 into a special-purpose controller for controlling the wafer polishing apparatus 10 according to operations in example embodiments according to FIGS. 7 to 17 of the present application.

In an embodiment, the controller 600 may control the polishing pad 120 and the polishing head 130 and rotate the polishing pad 120 and the polishing head 130 to perform a wafer polishing process.

In an embodiment, the controller 600 may control the illumination device 200 and the camera device 300 to detect a defect on the inner surface of the retainer ring 150. For example, the controller 600 may control the illumination device 200 and the camera device 300 to move the illumination device 200 and the camera device 300 in at least one of a horizontal direction or a vertical direction. Also, the controller 600 may control the illumination device 200 and the camera device 300 to adjust an illumination angle of the illumination device 200 and a capture angle of the camera device 300.

In addition, in order to capture the image of the inner surface of the retainer ring 150 through the camera device 300 in a state in which the retainer ring 150 rotates, the controller 600 may control the polishing head 130 to which the retainer ring 150 is coupled.

In an embodiment, during a defect detection process of the inner surface of the retainer ring 150 using the illumination device 200 and the camera device 300, the controller 600 may control the cleaning liquid supply pump 630 so that the illumination cleaning liquid supply pipe 230 of the illumination device 200 supplies the cleaning liquid to the illumination lens 220 but the camera cleaning liquid supply pipe 340 of the camera device 300 does not supply the cleaning liquid to the camera lens 320.

In addition, during the defect detection process of the inner surface of the retainer ring 150 using the illumination device 200 and the camera device 300, the controller 600 may control the cleaning gas supply pump 640 so that the camera cleaning gas supply pipe 350 of the camera device 300 supplies the cleaning gas to the camera lens 320.

Figure 7:
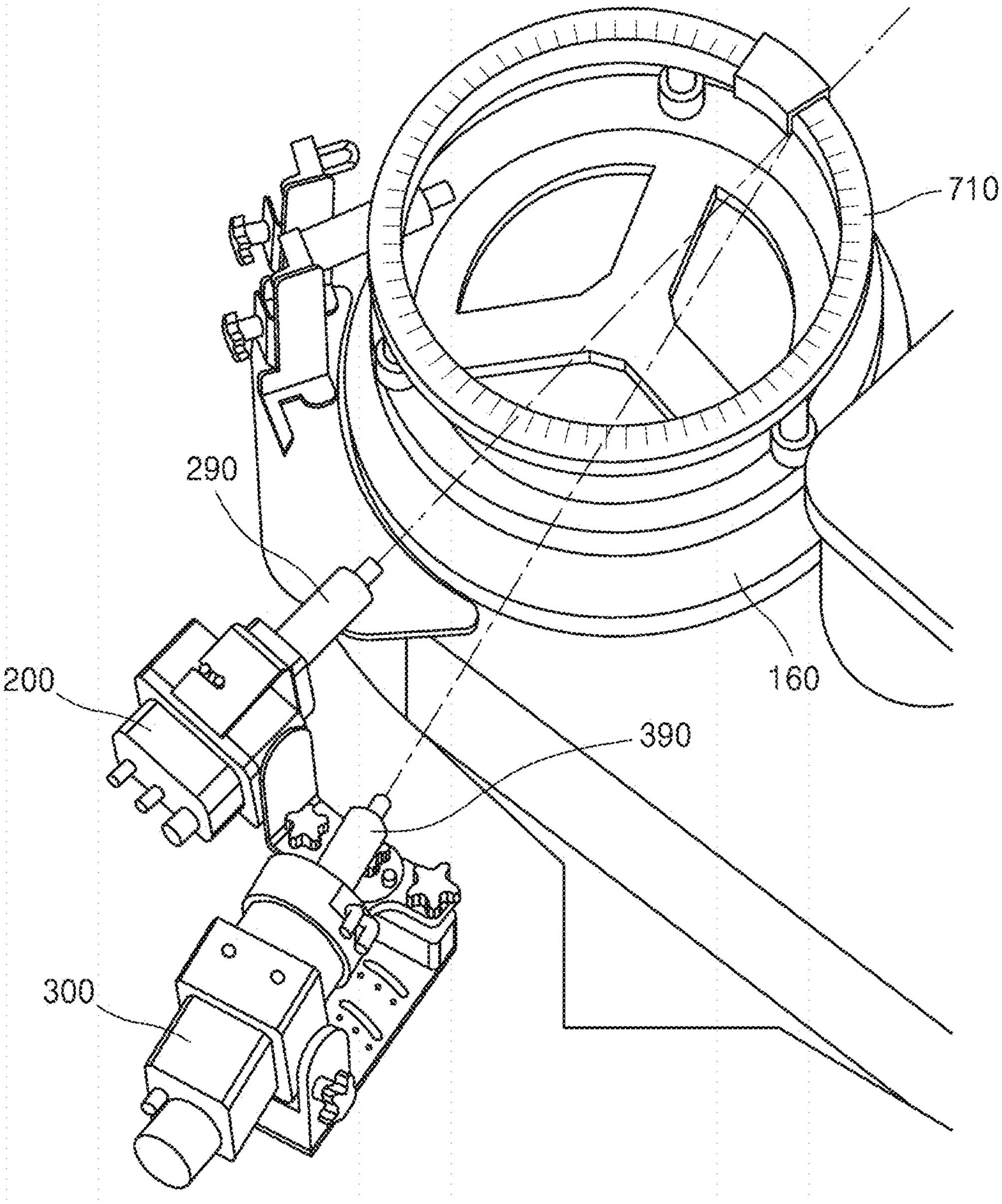
FIG. 7 is a diagram illustrating an operation of aligning the illumination device and the camera device of the wafer polishing apparatus according to an embodiment of inventive concepts.

FIG. 7 is a diagram illustrating an operation of aligning the illumination device 200 and the camera device 300 of the wafer polishing apparatus 10 according to an embodiment of inventive concepts.

According to the comparative example, the illumination device 200 and the camera device 300 of the wafer polishing apparatus 10 may be aligned with respect to any one of a plurality of polishing heads 130 attached to a lower portion of the polishing head support 140.

However, when the polishing heads 130 are provided in plurality, a positional error between the plurality of polishing heads 130 may occur. Accordingly, when the illumination device 200 and the camera device 300 are aligned with respect to the polishing head 130, a brightness distribution of photos of inner surfaces of a plurality of retainer rings 150 captured through the illumination device 200 and the camera device 300 may be increased.

According to an embodiment of inventive concepts, the wafer polishing apparatus 10 may further include an alignment jig 710 in a ring shape mounted on the transfer plate 160. The alignment jig 710 may be an auxiliary instrument that is mounted on the transfer plate 160 in the operation of aligning the illumination device 200 and the camera device 300, but is removed from the plate 160 after the operation of aligning the illumination device 200 and the camera device 300 is performed.

In addition, the illumination device 200 according to an embodiment of inventive concepts further may include an illumination alignment laser 290 that is detachably attached to a front surface of the illumination device 200, and the camera device 300 may further include a camera alignment laser 390 that is detachably attached to a front surface of the camera device 300.

In an embodiment, the illumination device 200 and the camera device 300 of the wafer polishing apparatus 10 may be aligned with respect to a part of the alignment jig 710 mounted on the transfer plate 160, by using the illumination alignment laser 290 and the camera alignment laser 390. For example, a location of the illumination device 200 may be controlled so that light emitted by the illumination alignment laser 290 is focused on an illumination alignment reference point of the alignment jig 710, and a location of the camera device 300 may be controlled so that light emitted by the camera alignment laser 390 is focused on a camera alignment reference point of the alignment jig 710.

When the illumination device 200 and the camera device 300 are aligned with respect to the alignment jig 710, the brightness distribution of photos of the inner surfaces of the plurality of retainer rings 150 captured through the illumination device 200 and the camera device 300 may be reduced.

Hereinafter, a method S100 of detecting a defect of the retainer ring 150 according to an embodiment of inventive concepts will be described. Specifically, the method S100 of detecting the defect of the retainer ring 150 of inventive concepts may be a method of detecting the defect formed on the inner surface of the retainer ring 150 using the wafer polishing apparatus 10 according to an embodiment of inventive concepts.

Figure 8:
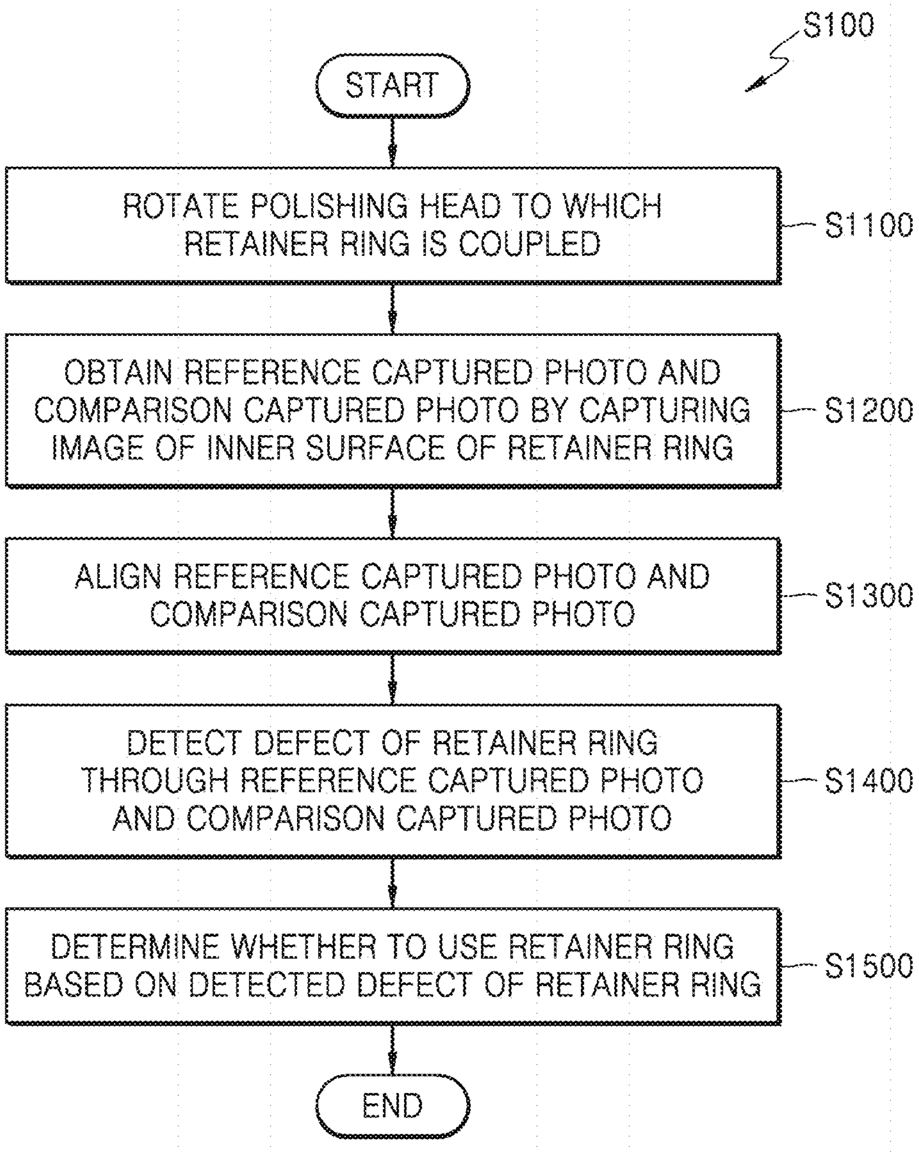
FIG. 8 is a flowchart illustrating operations of a method of detecting a defect of a retainer ring according to an embodiment of inventive concepts.

FIG. 8 is a flowchart illustrating operations of the method S100 of detecting the defect of the retainer ring 150 according to an embodiment of inventive concepts. Also, FIGS. 9 to 17 are diagrams illustrating respective operations of the method S100 of detecting the defect of the retainer ring 150 according to an embodiment of inventive concepts.

Referring to FIG. 8, the method S100 of detecting the defect of the retainer ring 150 according to an embodiment of inventive concepts may include operation S1100 of rotating the polishing head 130 to which the retainer ring 150 is coupled, operation S1200 of obtaining a reference captured photo and a comparison captured photo by capturing an image of an inner surface of the retainer ring 150, operation S1300 of aligning the reference captured photo and the comparison captured photo, operation S1400 of detecting the defect of the retainer ring 150 through the reference captured photo and the comparison captured photo, and operation S1500 of determining whether to use the retainer ring 150 based on the detected defect of the retainer ring 150.

Figure 9:
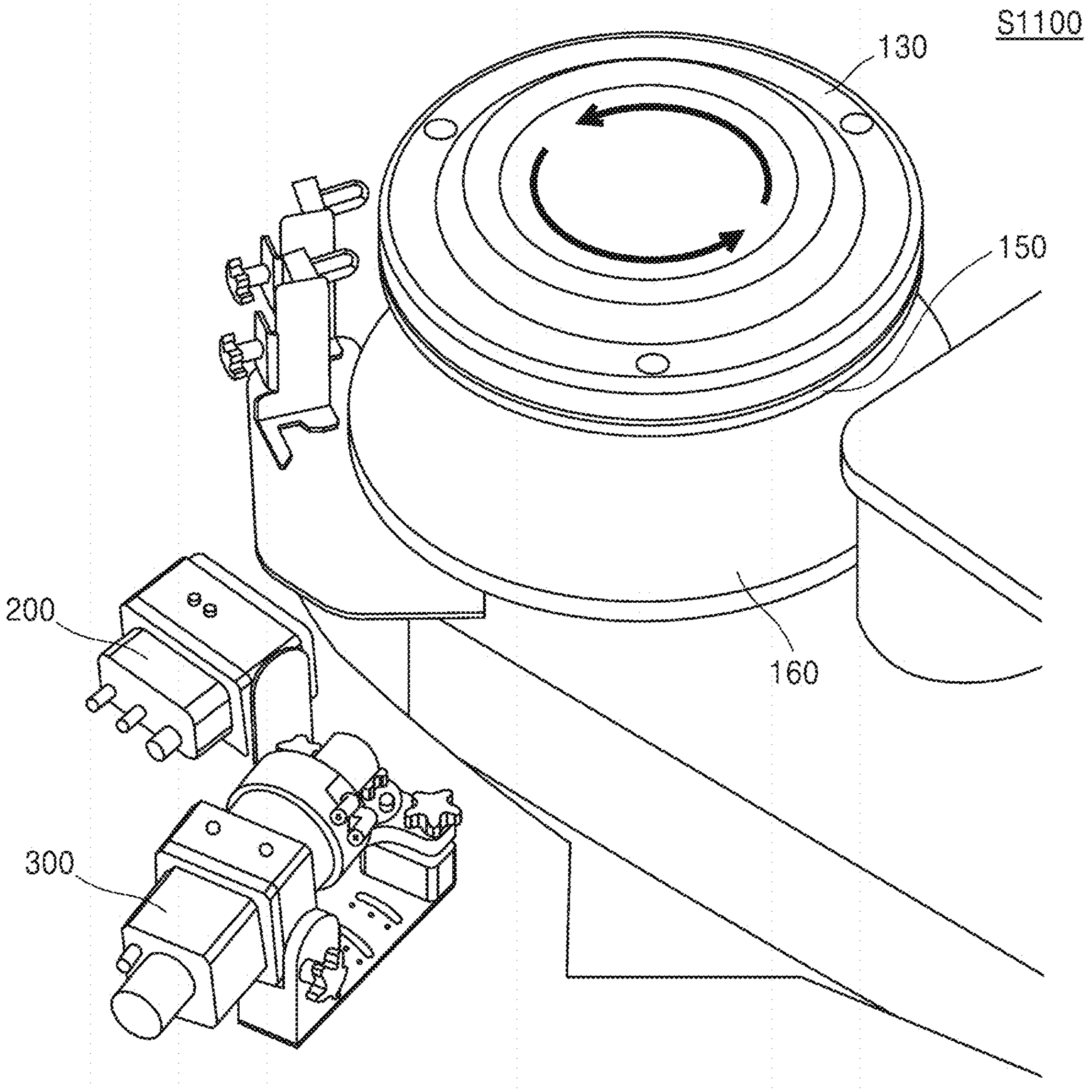
FIG. 9 is a diagram illustrating an operation of rotating a polishing head to which a retainer ring is coupled according to an embodiment of inventive concepts.

Referring to FIGS. 8 and 9 together, the method S100 of detecting the defect of the retainer ring 150 according to an embodiment of inventive concepts may include operation S1100 of rotating the polishing head 130 to which the retainer ring 150 is coupled.

In operation S1100, the controller (600 in FIG. 6) may control the polishing head 130 to rotate with respect to an axis extending in a vertical direction. As the polishing head 130 rotates, the retainer ring 150 attached to a lower portion of the polishing head 130 may also rotate.

Referring to FIGS. 8 and 10 together, the method S100 of detecting the defect of the retainer ring 150 according to an embodiment of inventive concepts may include operation S1200 of obtaining the reference captured photo and the comparison captured photo by capturing an image of an inner surface of the retainer ring 150.

In operation S1200, while the retainer ring 150 rotates, the camera device 300 may capture the image of the inner surface of the retainer ring 150. Specifically, while the retainer ring 150 rotates a plurality of times, the camera device 300 may continuously capture the image of the inner surface of the retainer ring 150 to obtain capture photo data Pd.

The capture photo data Pd may include a reference captured photo P1 captured by the camera device 300 when the retainer ring 150 rotates a first time, and a comparison captured photo P2 captured by the camera device 300 when the retainer ring 150 rotates a second time different from the first time.

For example, a photo captured by the camera device 300 when the retainer ring 150 rotates the first time is the reference captured photo P1, and a photo captured by the camera device 300 when the retainer ring 150 rotates the second time is the comparison captured photo P2.

However, inventive concepts are not limited thereto, and the photo captured by the camera device 300 when the retainer ring 150 rotates the first time is the comparison captured photo P2, and a photo captured by the camera device 300 when the retainer ring 150 rotates the second time is the reference captured photo P1.

In operation S1200, the controller 600 may control the illumination device 200 to provide light in a line shape to a part of the inner surface of the retainer ring 150. In addition, while the retainer ring 150 rotates, the controller 600 may control the camera device 300 so that the part of the inner surface of the retainer ring 150 to which light is provided by the illumination device 200 is line-scanned by the camera device 300 including a line scan camera.

In an embodiment, in operation S1200, the controller 600 may control the cleaning liquid supply pump (630 in FIG. 6) so that the illumination cleaning liquid supply pipe (230 in FIG. 3) of the illumination device 200 supplies a cleaning liquid to the illumination lens 220, but the camera cleaning liquid supply pipe (340 in FIG. 3) of the camera device 300 does not supply the cleaning liquid to the camera lens 320.

In operation S1200, the cleaning liquid may be supplied to the illumination lens 220, and thus foreign substances generated in a wafer polishing process may be limited and/or prevented from being adsorbed on a surface of the illumination lens 220, and the illumination performance of the illumination device 200 may be improved.

In an embodiment, in operation S1200, the controller 600 may control the cleaning gas supply pump (640 in FIG. 6) so that the camera cleaning gas supply pipe (350 in FIG. 3) of the camera device 300 supplies a cleaning gas to the camera lens 320.

In operation S1200, the cleaning gas may be supplied to the camera lens 320, and thus foreign substances generated in the wafer polishing process may be limited and/or prevented from being adsorbed on the surface of the camera lens 320, and the performance of the camera device 300 may be improved. Accordingly, the quality of the capture photo data Pd obtained in operation S1200 may be improved.

Figure 11:
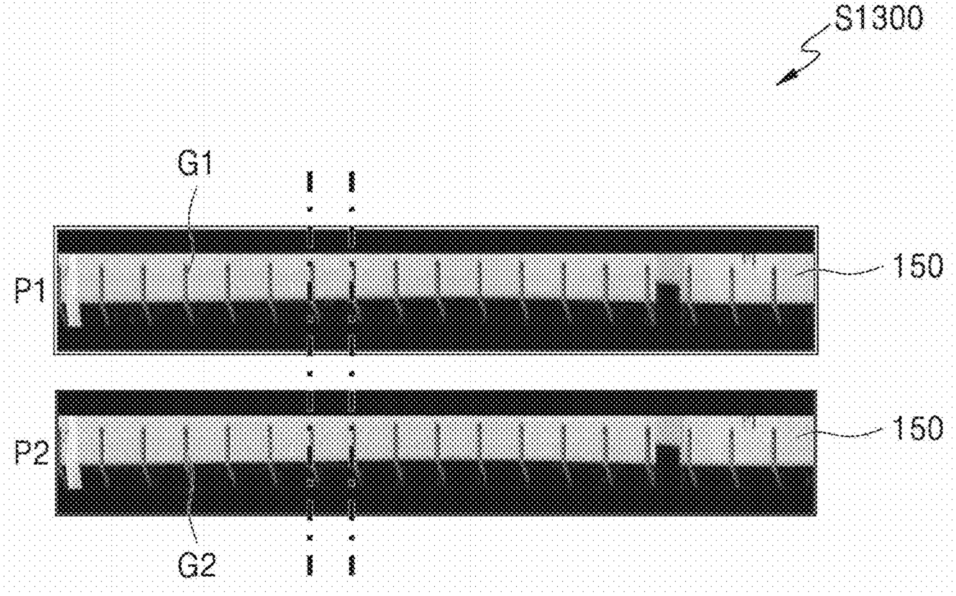
FIG. 11 is a diagram illustrating an operation of aligning the reference captured photo and the comparison captured photo according to an embodiment of inventive concepts.

Referring to FIGS. 8 and 11 together, the method S100 of detecting the defect of the retainer ring 150 according to an embodiment of inventive concepts may include operation S1300 of aligning the reference captured photo P1 and the comparison captured photo P2 and may be performed using the controller 600.

In operation S1100 of rotating the polishing head 130 to which the retainer ring 150 is coupled, when the polishing head 130 does not rotate at a constant speed, the total length of the reference captured photo P1 and the total length of the comparison captured photo P2 captured by the camera device 300 may be different from each other in a horizontal direction. In addition, spaces between first grooves G1 of the retainer ring 150 included in the reference captured photo P1 may be different from spaces between second grooves G2 of the retainer ring 150 included in the comparison captured photo P2.

Operation S1300 may include an operation of correcting the reference captured photo P1 and the comparison captured photo P2 so that the spaces between first grooves G1 of the retainer ring 150 included in the reference captured photo P1 are substantially the same as the spaces between second grooves G2 of the retainer ring 150 included in the comparison captured photo P2.

In addition, operation S1300 may include an operation of correcting the reference captured photo P1 and the comparison captured photo P2 so that the total length of the reference captured photo P1 in the horizontal direction is substantially the same as the total length of the comparison captured photo P2 in the horizontal direction.

Referring to FIGS. 8 and 12 to 16 together, the method S100 of detecting the defect of the retainer ring 150 according to an embodiment of inventive concepts may include operation S1400 of detecting the defect of the retainer ring 150 through the reference captured photo P1 and the comparison captured photo P2. Operation S1400, including operations S1410 to S1470 and S1410*a* to S1410*d* described later with respect to FIGS. 12-13, may be performed using the controller 600.

In addition, operation S1400 of detecting the defect of the retainer ring 150 may include operation S1410 of specifying an inspection region of the retainer ring 150, operation S1430 of detecting the defect of the retainer ring 150 by overlapping an inspection region of the reference captured photo P1 and an inspection region of the comparison captured photo P2, operation S1450 of measuring depths of the grooves G1 and G2 of the retainer ring by using at least one of the reference captured photo P1 or the comparison captured photo P2, and operation S1470 of measuring a degree of warpage of the retainer ring 150 by using at least one of the reference captured photo P1 or the comparison captured photo P2.

Figure 12:
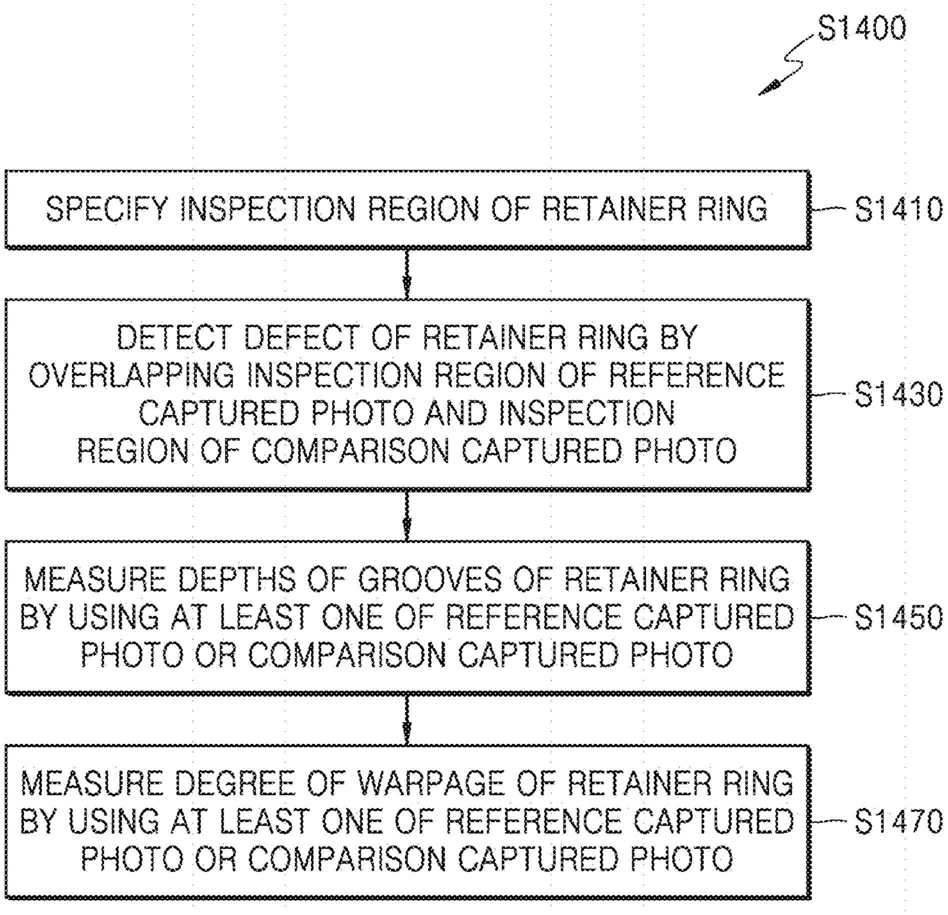
FIG. 12 is a flowchart illustrating an operation of detecting the defect of the retainer ring by comparing the reference captured photo with the comparison captured photo according to an embodiment of inventive concepts.
Figure 13:
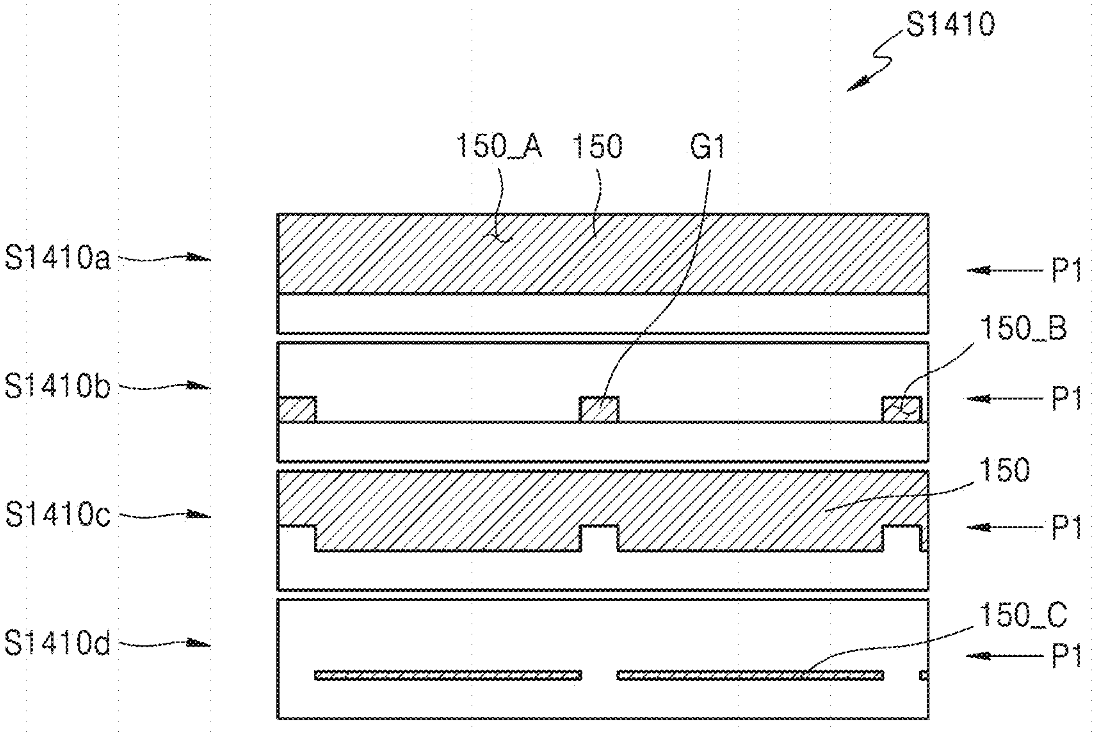
FIG. 13 is a diagram illustrating an operation of specifying an inspection region of the retainer ring according to an embodiment of inventive concepts.

Referring to FIGS. 12 and 13 together, operation S1410 may include operation S1410*a* of detecting an entire region 150_A of the retainer ring 150 in the reference captured photo P1, operation S1410*b* of detecting a region 150_B of the grove G1 of the retainer ring 150 in the reference captured photo P1, operation S1410*c* of excluding the region 150_B of the grove G1 of the retainer ring 150 detected in operation S1410*b* from the entire region 150_A of the retainer ring 150 detected in operation S1410*a*, and operation S1410*d* of specifying a part 150_C in contact with a wafer in a region detected in operation S1410*c*.

In addition, operation S1410 may include an operation of detecting an entire region of the retainer ring 150 in the comparison captured photo P2, an operation of detecting a region of the groove G2 of the retainer ring 150 in the comparison captured photo P2, an operation of excluding the region of the groove G2 of the retainer ring 150 from the entire region of the retainer ring 150, and an operation of specifying a part in contact with the wafer in the region of the retainer ring 150.

Figure 14:
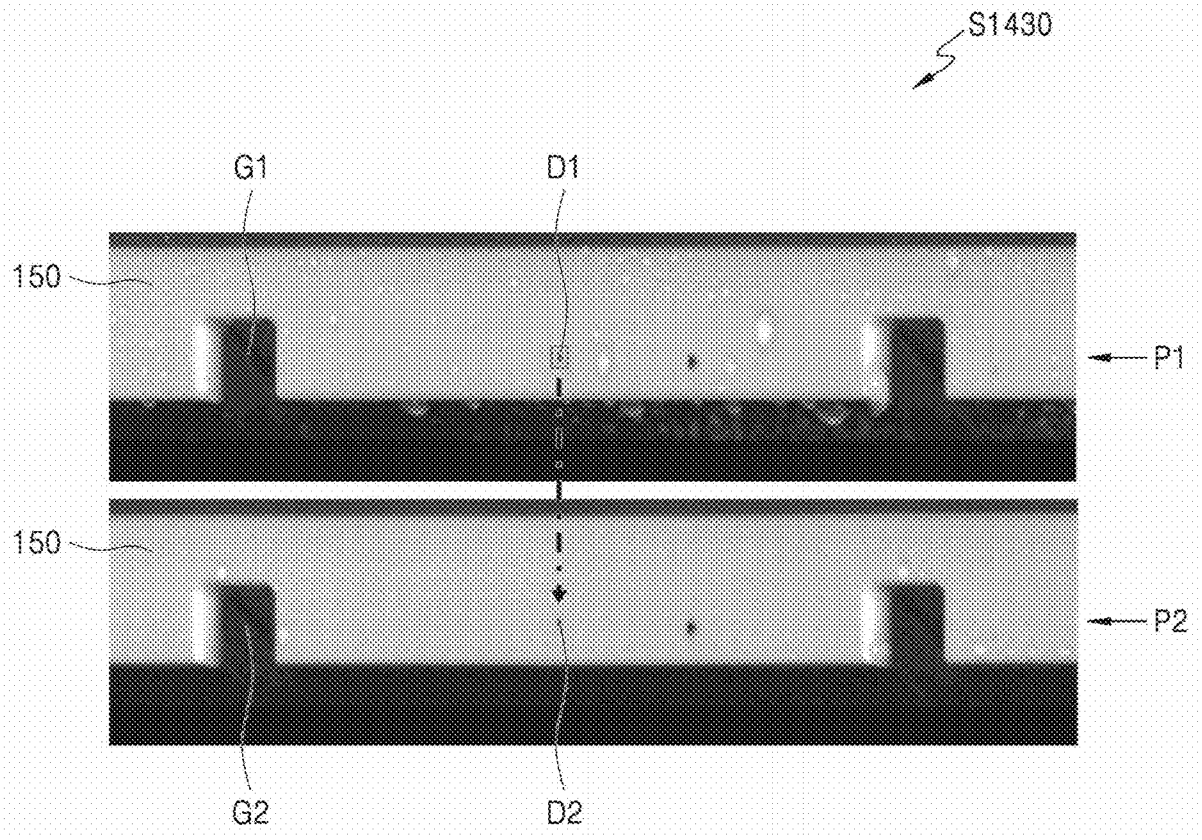
FIG. 14 is a diagram illustrating an operation of detecting the defect of the retainer ring by overlapping an inspection region of the reference captured photo and an inspection region of the comparison captured photo according to an embodiment of inventive concepts.

Referring to FIGS. 12 and 14 together, operation S1430 may be an operation of detecting the defect such as a scratch or a crack of the retainer ring 150 by overlapping the inspection region of the reference captured photo P1 and the inspection region of the comparison captured photo P2.

In an embodiment, in operation S1430, when a location of a defect D1 of the reference captured photo P1 overlaps a location of a defect D2 of the comparison captured photo P2, the defects D1 and D2 may be recognized as actual defects. However, when the location of the defect D1 of the reference captured photo P1 does not overlap the location of the defect D2 of the comparison captured photo P2, the defects D1 and D2 may not be recognized as actual defects.

Figure 15:
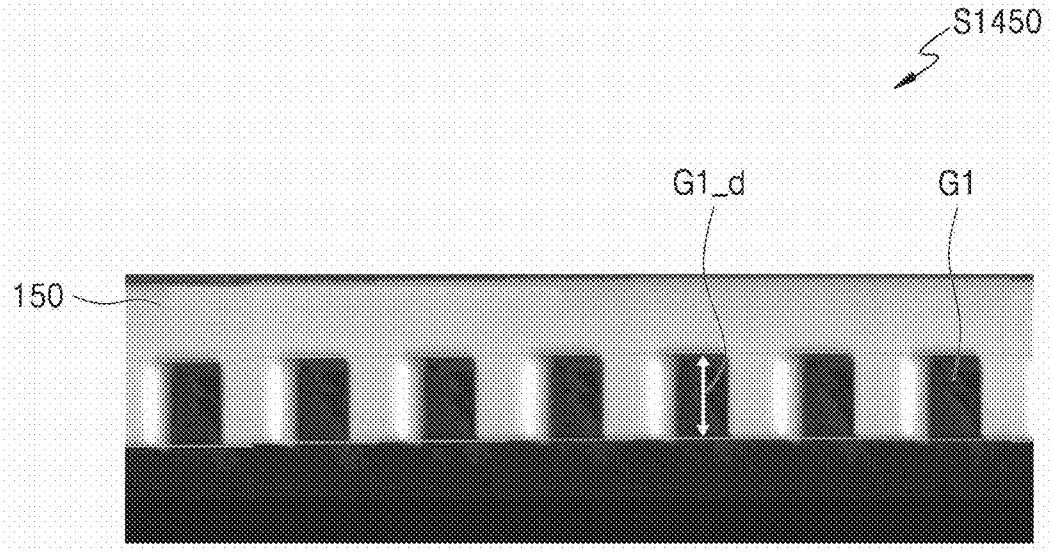
FIG. 15 is a diagram illustrating an operation of measuring depths of grooves of the retainer ring by using at least one of the reference captured photo or the comparison captured photo according to an embodiment of inventive concepts.

Referring to FIGS. 12 and 15 together, operation S1450 may be an operation of measuring a depth G1_*d* of the groove G1 of the retainer ring 150 by using at least one of the reference captured photo P1 or the comparison captured photo P2.

In an embodiment, in operation S1450, the depth G1_*d* of each of all the grooves G1 included in the retainer ring 150 may be measured. However, inventive concepts are not limited thereto, and in operation S1450, the depth G1_*d* of each of some selected from the grooves G1 included in the retainer ring 150 may be measured.

Figure 16:
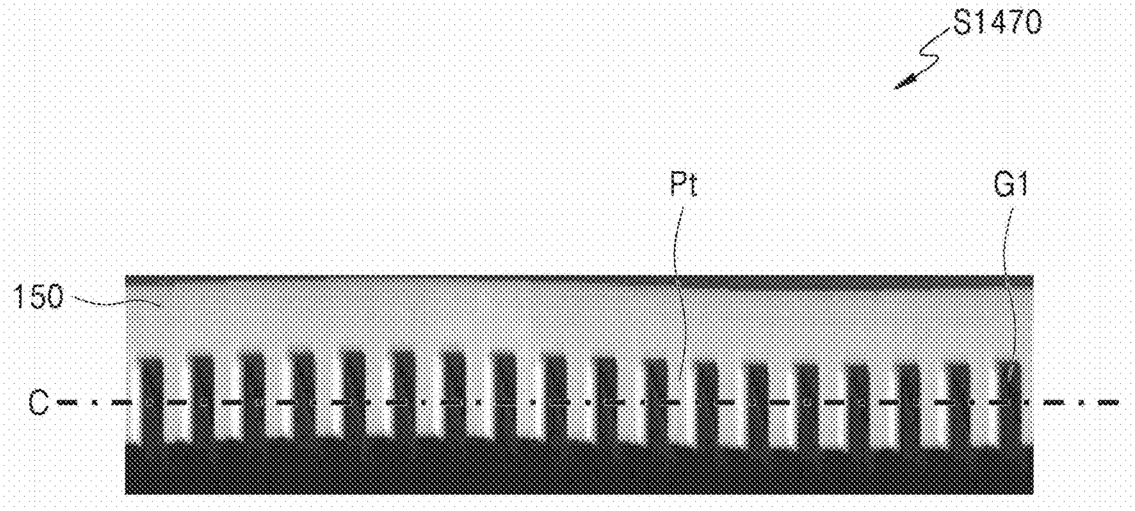
FIG. 16 is a diagram illustrating an operation of measuring a degree of warpage of the retainer ring by using at least one of the reference captured photo or the comparison captured photo according to an embodiment of inventive concepts.

Referring to FIGS. 12 and 16 together, operation S1470 may be an operation of measuring the degree of warpage of the retainer ring 150 by using at least one of the reference captured photo P1 or the comparison captured photo P2.

In general, when the retainer ring 150 is provided to warp, a surface of the wafer supported by the retainer ring 150 may not be uniformly polished by the polishing pad 120. Accordingly, operation S1470 may include measuring the degree of warpage of the retainer ring 150.

In the embodiment, operation S1470 may include an operation of measuring a length formed by the lowermost part of a plurality of protrusions Pt forming the plurality of grooves G1 of the retainer ring 150 from an evaluation line C in a vertical direction and an operation of measuring the degree of warpage of the retainer ring 150 based on the measured length.

That is, in operation S1400, a scratch and a crack formed on the inner surface of the retainer ring 150, the depth G1_*d* of the groove G1 of the retainer ring 150, and the degree of warpage of the retainer ring 150 may be measured.

Figure 17:
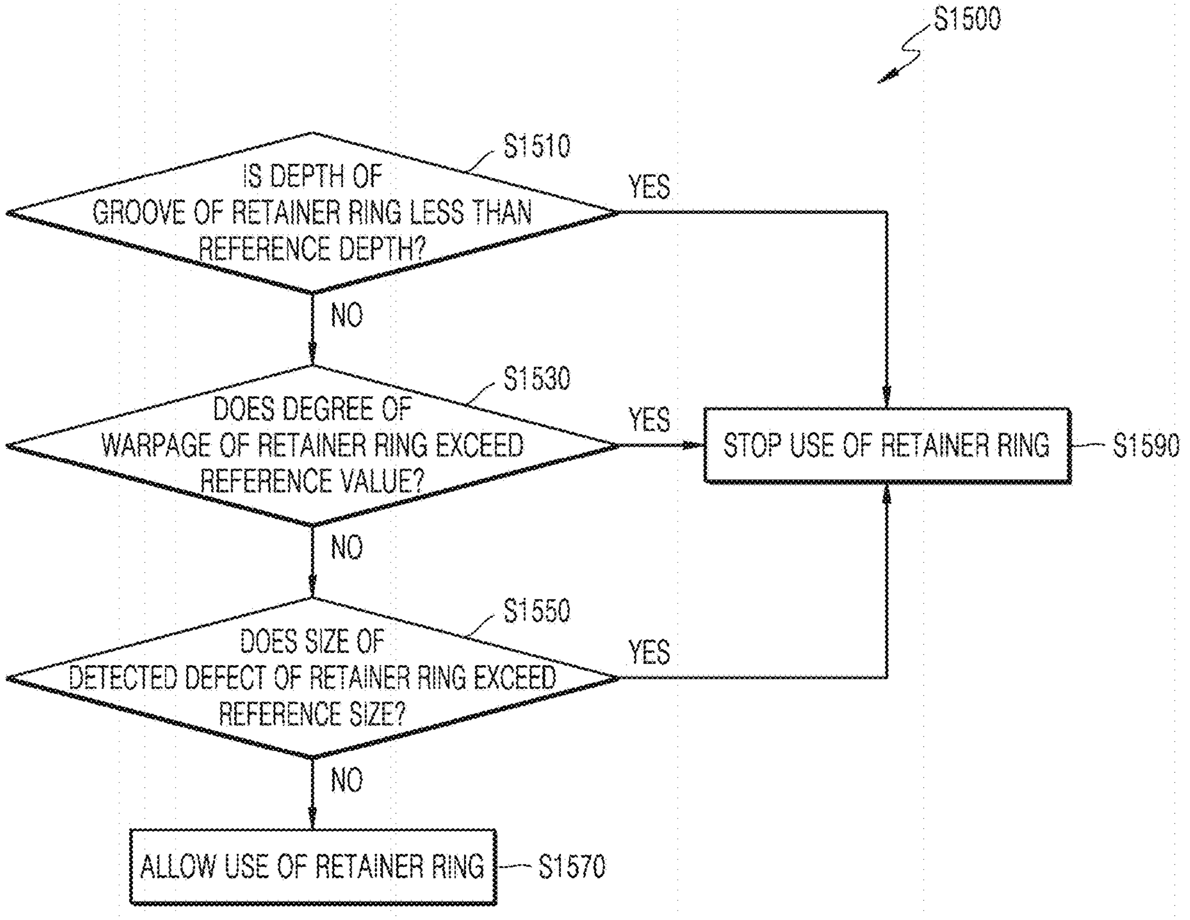
FIG. 17 is a flowchart illustrating an operation of determining whether to use the retainer ring based on the detected defect of the retainer ring according to an embodiment of inventive concepts.

Referring to FIGS. 8 and 17 together, the method S100 of detecting the defect of the retainer ring 150 according to an embodiment of inventive concepts may include operation S1500 of determining whether to use the retainer ring 150 based on the detected defect of the retainer ring 150. Operation S1500, including operations S1510 to S1590 described later in relation to FIG. 17, may be performed using the controller 600. For example, based on a result in operations S1510, S1530, and S1550, the controller 600 may control the wafer polishing apparatus 10 to perform operation S1590 for stopping the use of the retainer ring 150 or operation S1570 for allowing the use of the retainer ring 150.

Operation S1500 may be an operation of determining whether to allow use of the retainer ring 150 or stop use of the retainer ring 150 based on the defect of the retainer ring 150 detected in operation S1400. That is, the retainer ring 150 may include the plurality of grooves G1 to determine whether to use the retainer ring 150.

In an embodiment, operation S1500 may include operation S1510 of determining whether the depth of the groove G1 of the retainer ring 150 is less than a reference depth, operation S1530 of determining whether the degree of warpage of the retainer ring 150 exceeds a reference value, operation S1550 of determining whether the size of the detected defect of the retainer ring 150 exceeds a reference size, operation S1570 of allowing the use of the retainer ring 150, and operation S1590 of stopping the use of the retainer ring 150.

Operation S1510 may be an operation of determining whether the depth of the groove G1 of the retainer ring 150 measured in operation S1400 is less than the reference depth. In an embodiment, when the depth of the groove G1 of the retainer ring 150 is less than the reference depth, operation S1590 of stopping the use of the retainer ring 150 may be performed. Also, when the depth of the groove G1 of the retainer ring 150 exceeds the reference depth, operation S1530 of determining whether the degree of warpage of the retainer ring 150 exceeds the reference value may be performed.

Operation S1530 may be an operation of determining whether the degree of warpage of the retainer ring 150 measured in operation S1400 exceeds the reference value. In an embodiment, when the degree of warpage of the retainer ring 150 exceeds the reference value, operation S1590 of stopping the use of the retainer ring 150 may be performed. Also, when the degree of warpage of the retainer ring 150 is less than the reference value, operation S1550 of determining whether the size of the detected defect of the retainer ring 150 exceeds the reference size may be performed.

Operation S1550 may be an operation of determining whether the size of the defect of the retainer ring 150 detected in operation S1400 exceeds the reference size. In an embodiment, when the size of the defect of the retainer ring 150 exceeds the reference size, operation S1590 of stopping the use of the retainer ring 150 may be performed. In addition, when the size of the defect of the retainer ring 150 is less than the reference size, operation S1570 of allowing the use of the retainer ring 150 may be performed.

That is, when the depth of the groove G1 of the retainer ring 150, the degree of warpage of the retainer ring 150, and the size of the defect of the retainer ring 150 all satisfy evaluation criteria, the additional use of the retainer ring 150 may be allowed.

In addition, when at least one of the depth of the groove G1 of the retainer ring 150, the degree of warpage of the retainer ring 150, or the size of the defect of the retainer ring 150 does not satisfy the evaluation criteria, the use of the retainer ring 150 may be stopped.

The method S100 of detecting the defect of the retainer ring 150 according to an embodiment of inventive concepts may capture the image of the inner surface of the retainer ring 150 through the camera device 300 including a scan line camera while the retainer ring 150 rotates at a high speed, thereby quickly detecting the defect of the inner surface of the retainer ring 150.

The method S100 of detecting the defect of the retainer ring 150 according to an embodiment of inventive concepts may supply a cleaning gas to the camera lens 320 of the camera device 300 while capturing an image of the inner surface of the retainer ring 150, thereby improving a phenomenon in which foreign substances generated in a wafer polishing process are adsorbed to the camera lens 320.

In addition, the method S100 of detecting the defect of the retainer ring 150 according to an embodiment of inventive concepts may supply a cleaning liquid to the illumination lens 220 of the illumination device 200 while capturing an image of the inner surface of the retainer ring 150, thereby improving the phenomenon in which foreign substances generated in the wafer polishing process are adsorbed to the illumination lens 22. That is, the defect of the retainer ring 150 may be precisely detected through the illumination device 200 and the camera device 300.

In addition, the method S100 of detecting the defect of the retainer ring 150 according to an embodiment of inventive concepts may detect the defect of the retainer ring 150 through comparison of the reference captured photo P1 and the comparison captured photo P2 and determine whether to use the retainer ring 150 based on the detected defect. Accordingly, in the wafer polishing process, damage to the wafer by the retainer ring 150 may be limited and/or prevented.

In operation S1500 of FIGS. 8 and S1590 of FIG. 17, if a determination is made to stop the use of the retainer ring 150, then the retainer ring 150 in the wafer polishing apparatus may be replaced with a new or refurbished retainer ring. After replacing the retainer ring 150 with a new or refurbished retainer ring, the method S100 in FIG. 8 of detecting the defect of the retainer ring may be repeated on the wafer polishing apparatus with the new or refurbished retainer ring to determine whether to use (or not to use) the new or refurbished retainer based on if a defect is detected in the new or refurbished retainer ring. Operations S1400 and S1500 according to flowcharts and diagrams in FIGS. 12 to 17 may be repeated on the wafer polishing apparatus including the new or refurbished retainer ring to determine if the new or refurbished retainer ring satisfies the criteria in operations S1510, S1530, and S1550. Then, if a determination is made that the new or refurbished retainer ring may be used, the wafer polishing apparatus subsequently may be used in a polishing process for manufacturing a semiconductor device.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts have been particularly shown and described with reference to embodiments thereof, it will be understood that various changes in form and details may be made therein without departing from the spirit and scope of the following claims.

What is claimed is:

1. A wafer polishing apparatus comprising:
a base support;
a polishing head on an upper portion of the base support, the polishing head configured to rotate;
a retainer ring attached to a lower portion of the polishing head;
an illumination device configured to provide light to at least a part of an inner surface of the retainer ring; and
a camera device configured to capture an image of at least a part of the inner surface of the retainer ring, wherein
the camera device includes a camera housing, a camera lens inside the camera housing, a cover ring on a front surface of the camera lens and configured to expose the camera lens, a camera cleaning liquid supply pipe connected to the cover ring and configured to supply a cleaning liquid to the front surface of the camera lens, a camera cleaning gas supply pipe connected to the cover ring and configured to provide cleaning gas to the front surface of the camera lens, and a protective cap coupled to the cover ring,
the cover ring is coupled to the camera housing,
the protective cap is configured to expose at least a part of the front surface of the camera lens and configured to provide a discharge passage of the cleaning gas, wherein
the camera device further comprises a camera cleaning liquid spray pipe connected to the camera cleaning liquid supply pipe,
the camera cleaning liquid spray pipe is in the cover ring, and
the camera cleaning liquid spray pipe has a spiral shape.

2. The wafer polishing apparatus of claim 1, wherein the camera cleaning liquid supply pipe is configured to provide deionized water (DIW).

3. The wafer polishing apparatus of claim 1, wherein the camera cleaning gas supply pipe is configured to provide nitrogen ($N_2$) in the cleaning gas.

4. The wafer polishing apparatus of claim 1, further comprising:
a cleaning liquid supply pump configured to supply the cleaning liquid to the camera cleaning liquid supply pipe;
a cleaning gas supply pump configured to supply the cleaning gas to the cleaning gas supply pipe; and
a controller connected to the cleaning liquid supply pump and the cleaning gas supply pump.

5. The wafer polishing apparatus of claim 4, wherein
the controller is configured to control the cleaning liquid supply pump when the camera device is in a standby state so that the camera cleaning liquid supply pipe supplies the cleaning liquid to the front surface of the camera lens, and
the standby state of the camera device is a status where an image of the retainer ring is not captured.

6. The wafer polishing apparatus of claim 5, wherein
the controller is further configured to, control the cleaning liquid supply pump and the cleaning gas supply pump when the camera device is in an operation state so that the cleaning liquid supply pipe stops supplying of the cleaning liquid and so that the cleaning gas supply pipe supplies the cleaning gas to the front surface of the camera lens, and
the operation state of the camera device is a status where the image of the retainer ring is captured.

7. The wafer polishing apparatus of claim 1, wherein
the illumination device comprises an illumination housing, an illumination light source inside the illumination housing, an illumination lens inside the illumination housing and in front of the illumination light source, and an illumination cleaning liquid supply pipe connected to the illumination housing, and the illumination cleaning liquid supply pipe is configured to supply the cleaning liquid to a front surface of the illumination lens.

8. The wafer polishing apparatus of claim 1, wherein the camera device is configured to capture an image of at least a part of the inner surface of the retainer ring while the retainer ring is rotated by the polishing head.

9. A wafer polishing apparatus comprising:

a base support including a treatment region and a maintenance region;

a polishing pad on the treatment region of the base support;

a polishing head on an upper portion of the base support and configured to rotate; a polishing head support on the upper portion of the base support and connected to the polishing head, the polishing head support configured to rotate on the base support such that the polishing head is on at least one of the treatment region or the maintenance region of the base support;

a retainer ring attached to a lower portion of the polishing head;

an illumination device configured to provide light to at least a part of an inner surface of the retainer ring; and a camera device configured to capture an image of at least a part of the inner surface of the retainer ring while the polishing head rotates, wherein:

the illumination device comprises an illumination housing, an illumination light source inside the illumination housing, an illumination lens inside the illumination housing and in front of the illumination light source, and an illumination cleaning liquid supply pipe connected to the illumination housing, and the illumination cleaning liquid supply pipe is configured to supply the cleaning liquid to a front surface of the illumination lens.

10. The wafer polishing apparatus of claim 9, wherein the camera device comprises a line scan camera.

11. The wafer polishing apparatus of claim 10, wherein the illumination device comprises a cylindrical lens configured to provide light in a line shape to a part of the inner surface of the retainer ring.

12. The wafer polishing apparatus of claim 9, further comprising:

a transfer plate on the maintenance region;

an alignment jig mounted on the transfer plate;

an illumination alignment laser attached to the illumination device and configured to provide light to a part of the alignment jig; and a camera alignment laser attached to the camera device and configured to provide light to a part of the alignment jig.

13. The wafer polishing apparatus of claim 9, wherein the camera device comprises a camera housing, a camera lens inside the camera housing, a cover ring on a front surface of the camera lens and configured to expose the camera lens, a camera cleaning liquid supply pipe connected to the cover ring and configured to provide a movement path of a cleaning liquid, a cleaning liquid spray pipe connected to the camera cleaning liquid supply pipe, a camera cleaning gas supply pipe connected to the cover ring and configured to provide cleaning gas to the front surface of the camera lens, and a protective cap coupled to the cover ring, the cover ring is coupled to the camera housing, the cleaning liquid spray pipe is a spiral shape, the cleaning liquid spray pipe is inside the cover ring, the cleaning liquid spray pipe is configured to spray the cleaning liquid to the camera lens, and the protective cap being configured to expose at least a part of the front surface of the camera lens and configured to provide a discharge passage of the cleaning gas.

14. The wafer polishing apparatus of claim 13, wherein the cleaning liquid comprises deionized water (DIW), and the cleaning gas comprises nitrogen ($N_2$).

15. A wafer polishing apparatus comprising:

a base support including a treatment region and a maintenance region;

a polishing pad on the treatment region of the base support;

a polishing head on an upper portion of the base support and configured to rotate;

a polishing head support on the upper portion of the base support and connected to the polishing head, the polishing head support configured to rotate on the base support such that the polishing head is on at least one of the treatment region or the maintenance region of the base support;

a retainer ring attached to a lower portion of the polishing head;

a transfer plate on the maintenance region;

an illumination device configured to provide light to at least a part of an inner surface of the retainer ring;

a camera device configured to capture an image of at least a part of the inner surface of the retainer ring while the polishing head rotates, wherein the camera device includes a camera housing, a camera lens inside the camera housing, a cover ring on a front surface of the camera lens and configured to expose the camera lens, a camera cleaning liquid supply pipe connected to the cover ring and configured to supply a cleaning liquid to the front surface of the camera lens, a camera cleaning gas supply pipe connected to the cover ring and configured to provide cleaning gas to the front surface of the camera lens, and a protective cap coupled to the cover ring, the cover ring is coupled to the camera housing, the protective cap is configured to expose at least a part of the front surface of the camera lens and configured to provide a discharge passage of the cleaning gas, a cleaning liquid supply pump configured to supply the cleaning liquid to the camera cleaning liquid supply pipe;

a cleaning gas supply pump configured to supply the cleaning gas to the cleaning gas supply pipe; and a controller is configured to control the cleaning liquid supply pump and the cleaning gas supply pump, wherein the camera device further comprises a camera cleaning liquid spray pipe connected to the camera cleaning liquid supply pipe, the camera cleaning liquid spray pipe is in the cover ring, and the camera cleaning liquid spray pipe has a spiral shape.

16. The wafer polishing apparatus of claim 15, wherein the controller is configured to control the cleaning liquid supply pump when the camera device is in a standby state so that the camera cleaning liquid supply pipe supplies the cleaning liquid to the front surface of the camera lens, and the standby state of the camera device is a status where an image of the retainer ring is not captured the controller is configured to, control the cleaning liquid supply pump and the cleaning gas supply pump when the camera device is in an operation state so that the cleaning liquid supply pipe stops supplying of the cleaning liquid and so that the cleaning gas supply pipe supplies the cleaning gas to the front surface of the camera lens, and the operation state of the camera device is a status where the image of the retainer ring is captured.

17. The wafer polishing apparatus of claim 15, further comprising:

an alignment jig mounted on the transfer plate;

an illumination alignment laser attached to the illumination device and configured to provide light to a part of the alignment jig; and a camera alignment laser attached to the camera device and configured to provide light to a part of the alignment jig.

18. The wafer polishing apparatus of claim 17, wherein each of a light emitted by the illumination alignment laser and a light emitted by the camera alignment laser is focused on an illumination alignment reference point of the alignment jig.

19. The wafer polishing apparatus of claim 15, wherein the retainer ring further comprises a plurality of grooves to determine whether to use the retainer ring.

* * * * *